(12) United States Patent
Moore

(10) Patent No.: US 7,680,647 B2
(45) Date of Patent: Mar. 16, 2010

(54) ASSOCIATION-BASED BILINGUAL WORD ALIGNMENT

(75) Inventor: Robert C. Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 1058 days.

(21) Appl. No.: 11/158,129

(22) Filed: Jun. 21, 2005

(65) Prior Publication Data

US 2006/0287847 A1 Dec. 21, 2006

(51) Int. Cl.
*G06F 17/28* (2006.01)

(52) U.S. Cl. ............... 704/8; 704/2; 704/4; 704/5; 704/9

(58) Field of Classification Search ............ 704/1–9
See application file for complete search history.

(56) References Cited

U.S. PATENT DOCUMENTS

| | | | |
|---|---|---|---|
| 5,907,821 A | 5/1999 | Kaji et al. | |
| 6,236,958 B1 | 5/2001 | Lange et al. | 704/8 |
| 2002/0107683 A1* | 8/2002 | Eisele | 704/2 |
| 2002/0198701 A1* | 12/2002 | Moore | 704/2 |
| 2003/0061023 A1* | 3/2003 | Menezes et al. | 704/4 |
| 2003/0204400 A1* | 10/2003 | Marcu et al. | 704/251 |
| 2004/0044530 A1* | 3/2004 | Moore | 704/254 |
| 2005/0038643 A1 | 2/2005 | Koehn | 704/2 |
| 2005/0216253 A1 | 9/2005 | Brockett | |
| 2006/0190241 A1 | 8/2006 | Goutte et al. | 704/2 |
| 2008/0109209 A1 | 5/2008 | Fraser et al. | |

OTHER PUBLICATIONS

Ioannis Tsochantaridis et al., 2005, Large Margin Methods for Structured and Interdependent Output Variables. Journal of Machine Learning Research (JMLR) pp. 1453-1484.

Peter F. Brown et al., 1993. The Mathematics of Statistical Machine Translation: Parameter Estimation. Computational Linguistics, 19(2) :263-311.

Colin Cherry et al., 2003. A Probability Model to Improve Word Alignment. In Proceedings of the $41^{st}$ Meeting of the Association for Computational Linguistics, pp. 88-95, Sapporo, Japan.

Michael Collins, 2002. Discriminative Training Methods for Hidden Markov Models: Theory and Experiments with Perception Algorithms. In Proceedings of the Conference on Empirical Methods in Natural Language Processing (EMNLP) pp. 1-8, Philadelphia, Pennsylvania.

Rada Mihalcea et al., 2003. An Evaluation Exercise for Word Alignment. In Proceedings of the HLT-NAACL 2003 Workshop, Building and Using Parallel Texts: Data Driven Machine Translation and Beyond, pp. 1-6, Edmonton, Alberta Canada.

Robert C. Moore 2004. On Log-Likelihood-Ratios and the Significance of Rare Events. In Proceedings of the 2004 Conference on Empirical Methods in Natural Language Processing, pp. 333-340, Barcelona, Spain.

(Continued)

*Primary Examiner*—Richemond Dorvil
*Assistant Examiner*—Leonard Saint Cyr
(74) *Attorney, Agent, or Firm*—Joseph R. Kelly; Westman, Champlin & Kelly, P.A.

(57) ABSTRACT

A pair of bilingual, aligned text fragments are received and word type alignment is performed on the text fragments. Word token alignment is then performed.

17 Claims, 12 Drawing Sheets

OTHER PUBLICATIONS

Ted Dunning. 1993. Accurate Methods for Statistics of Surprise and Coincidence. Computation Linguistics, 19(1):61-74.

William A. Gale et al., 1991. Identifying Word Correspondences in Parallel Texts. In Proceedings of the Speech and Natural Language Workshop, pp. 152-157, Pacific Grove, CA.

Philipp Koehn et al., 2003. Statistical Phrase-Based Translation. In Proceedings *HTL-NAACL 2003), pp. 127-133, Edmonton, Alberta, Canada.

I. Dan Melamed. 1998. Models of Co-occurrences. University of Pennsylvania, IRCS Tech. Report #98-05.

I. Dan Melamed. 2000. Models of Translational Equivalence. Computational Linguistics 26(2):221-249.

Rada Mihalcdea et al. 2003. An Evaluation Exercise of Word Alignment. In Proceedings (HLT-NAACL) 2003 Workshop Building and Using Parallel Texts: Data Driven Machine Translation and Beyond, pp. 1-6, Edmonton, Alberta Canada.

Robert C. Moore. 2004. On Log-Likelihood Ratios and the Significance of Rare Events. In Proceedings of the 2004 Conference on Empirical Methods in Natural Language Processing, pp. 333-340, Barcelona, Spain.

Franz Joseph Och et al., 2003. A Systematic Comparison of Various Statistical Alignment Models. Computational Linguistics, 29(1):19-51.

PCT Search Report, PCT/US2006/037562 mailed Feb. 15, 2007.

* cited by examiner

ASSOCIATION-BASED BILINGUAL WORD ALIGNMENT

BACKGROUND

Machine translation is a process by which a textual input in a first language is automatically translated, using a computerized machine translation system, into a textual output in a second language. Some such systems operate using word based translation. In those systems, each word in the input text, in the first language, is translated into a corresponding word in the output text, in the second language. Better performing systems, however, are referred to as phrase-based translation systems. One example of those systems is set out in Koehn et al., *Statistical Phrase-Based Translation*, Proceedings of the Human Language Technology Conference of the North American Chapter of the Association for Computational Linguistics (HLT-NAACL) 127-133, Edmonton, Alberta, Canada (2003).

In order to train either of these two types of systems (and many other machine translation systems), current training systems often access a bilingual corpus. The training systems first align text fragments in the bilingual corpus such that a text fragment (e.g., a sentence) in the first language is aligned with a text fragment (e.g., a sentence) in the second language. When the text fragments are aligned sentences, this is referred to as a bilingual sentence-aligned data corpus.

In order to train the machine translation system, the training system must also know the individual word alignments within the aligned sentences. In other words, even though sentences have been identified as translations of one another in the bilingual, sentence-aligned corpus, the machine translation training system must also know which words in each sentence of the first language correspond to which words in the aligned sentence in the second language.

One current approach to word alignment makes use of five translation models and is discussed in Brown et al., *The Mathematics of StatisticalMachine Translation: Parameter Estimation*, Computational Linguistics, 19(2): 263-311 (1993). This approach to word alignment is sometimes augmented by a Hidden Markov Model (HMM) based model, or a combination of an HMM based model and Brown et al.'s fourth model, which has been called "Model 6". These latter models are discussed in F. Och and H. Ney, *A Systematic ComparisonofVarious StatisticalAlignment Models*, Computational Linguistics 29(1):19-51 (2003).

These word alignment models are less than ideal, in a number of different ways. The higher accuracy models are mathematically complex, and also difficult to train, because they do not permit a dynamic programming solution. It can thus take many hours of processing time on current standard computers to train the models and produce an alignment of a large parallel corpus.

The present invention addresses one, some, or all of these problems. However, these problems are not to be used to limit the scope of the invention in any way, and the invention can be used to address different problems, other than those mentioned, in machine translation.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A pair of bilingual, aligned text fragments are received and word type alignment is performed on the text fragments. Word token alignment is then performed.

In one embodiment, the word type alignment is performed using competitive linking, biasing the word type alignment toward linking word types in a given pair of text fragments based on whether they are also linked in other pairs of text fragments.

In another embodiment, word token alignment is performed based on a measure of non-monotonicity associated with the word token alignment.

DETAILED DESCRIPTION OF ILLUSTRATIVE EMBODIMENTS

The present discussion proceeds with respect to performing bilingual word alignment. However, before describing such a system in more detail, one illustrative environment in which the present invention can be implemented will be described.

Figure 1:
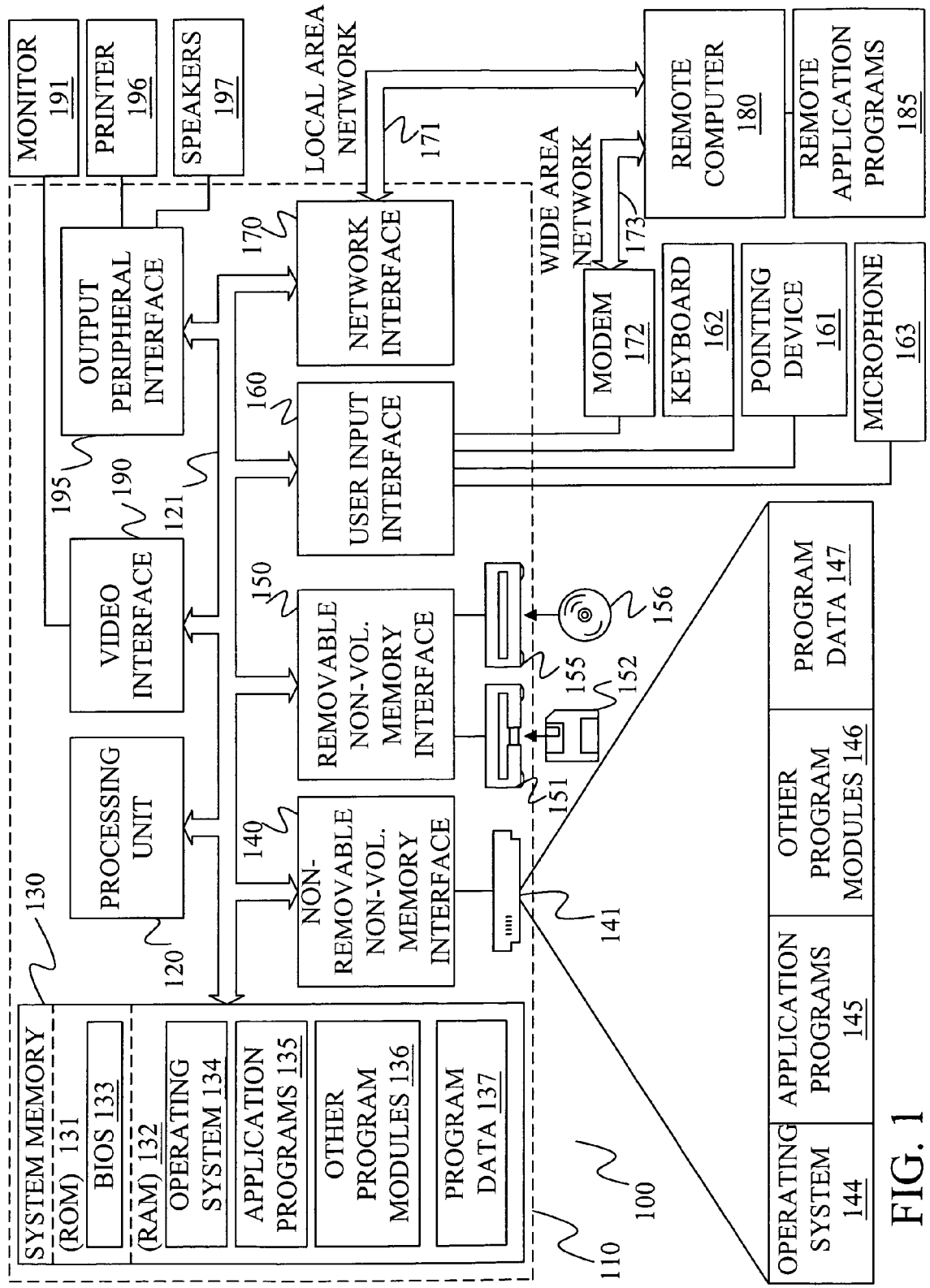
FIG. 1 is a block diagram of one illustrative embodiment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

One embodiment of the present invention uses a statistical measure of how strongly words in different languages are associated with one another in order to perform bilingual word alignment. The term "word" here and subsequently should be taken very broadly to include any relatively fixed sequence of characters (including a single character) for which a translation relationship can be meaningfully considered. For example, a single punctuation character such as a period or comma may be treated as a word. In the Chinese language, words are conventionally considered to consist usually of no more than one or two characters. For the purposes of bilingual word alignment, however, it has sometimes proved useful to treat each individual Chinese character as a single word.

On the other hand, many languages, including English, include fixed phrases, such as "in spite of", "according to", or "more than", which function as a single unit and might desirably be treated as single words for purposes of bilingual word alignment or translation. We might also consider breaking what are conventionally regarded as single words into a stem and an inflectional marker (or series of markers) and using each of those as a basic unit for word alignment. For example, the English word "went" might be decomposed into "go" followed by an inflectional marker that we might represent as "+PAST". In what follows, we simply assume that we are dealing with bilingual text segments that have been "tokenized", i.e., broken up, and perhaps transformed, in some way into discrete tokens that we may treat as words for alignment purposes.

While any statistical measure indicative of the strength of association between words can be used, one illustrative statistical measure is referred to as the log likelihood ratio (LLR) statistic. Assume, for instance, that the two languages being discussed are English and French. The log likelihood ratio statistic is a measure of the strength of association between a particular English word and a particular French word. Basically, the log likelihood ratio is computed from bilingual, aligned sentences. The LLR statistic measures how often an English word occurs in the English sentences, and how often a French word occurs in the French sentences, and how often they occur together in an aligned sentence pair. One way of calculating LLR scores for words in the training corpus is as follows:

$$LLR(f, e) = \sum_{f? \in \{f, \neg f\}} \sum_{e? \in \{e, \neg e\}} C(f?, e?) \log \frac{p(f?|e?)}{p(f?)} \qquad \text{Eq. 1}$$

In Equation 1, f and e refer to the words (in French and in English, respectively) whose degree of association is being measured. When the terms f and e are used, it means that those words occur in the respective target and source sentences of an aligned sentence pair, and ¬f and ¬e mean that the corresponding words do not occur in the respective sentences, whereas f? and e? are variables ranging over these values, and C(f?,e?) is the observed joint count for the values of f? and e?. The probabilities in Equation 1, p(f?|e?) and p(f?), illustratively refer to maximum likelihood estimates.

The LLR scores computed using Equation 1 for a pair of words is high if the words have either a strong positive association or a strong negative association. Therefore, in accordance with one embodiment, any negatively associated word pairs are discarded by requiring that p(f, e)<p(f)·p(e).

Figure 2:
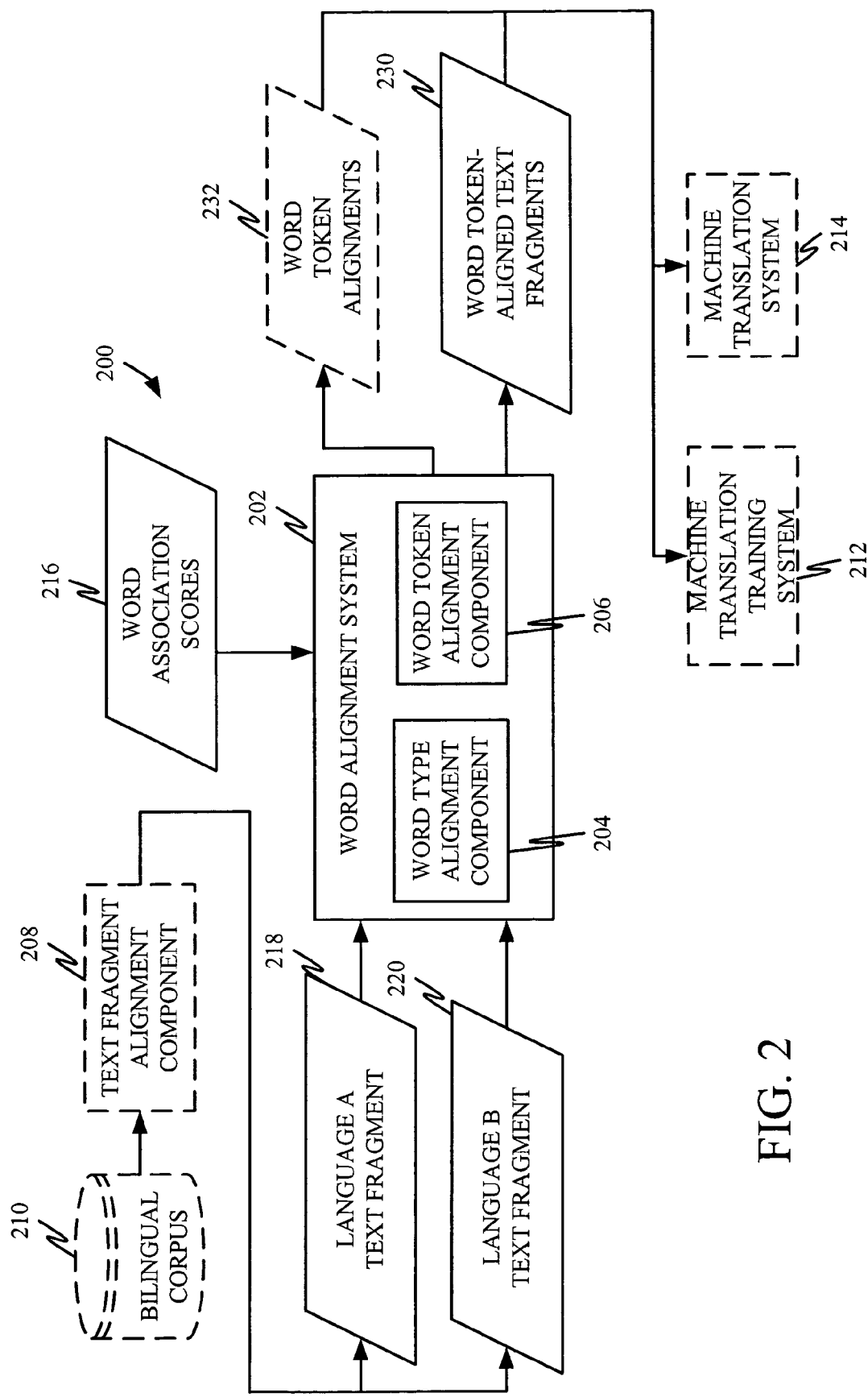
FIG. 2 is a more detailed block diagram of an alignment system in accordance with one embodiment of the present invention.

With that statistical measure in mind, FIG. 2 illustrates a block diagram of one alignment system 200 in accordance with one embodiment of the present invention. System 200 includes word alignment system 202 which, itself, includes word type alignment component 204 and word token alignment component 206. Word alignment system 202 is also shown coupled to an optional text fragment alignment component 208 which is coupled to bilingual corpus 210. Word alignment system 202 is also shown providing an alignment output to optional machine translation training system 212 and/or machine translation system 214.

In one embodiment, the invention can be found in word alignment system 202. Therefore, blocks 208, 210, 212 and 214 are shown in phantom, because they can be integrated into word alignment system 202, or they can be separate components and need not be integrated into word alignment system 202. In fact, the components of word alignment system 202 are useful either alone or with one another and without the other components in FIG. 2.

Figure 3:
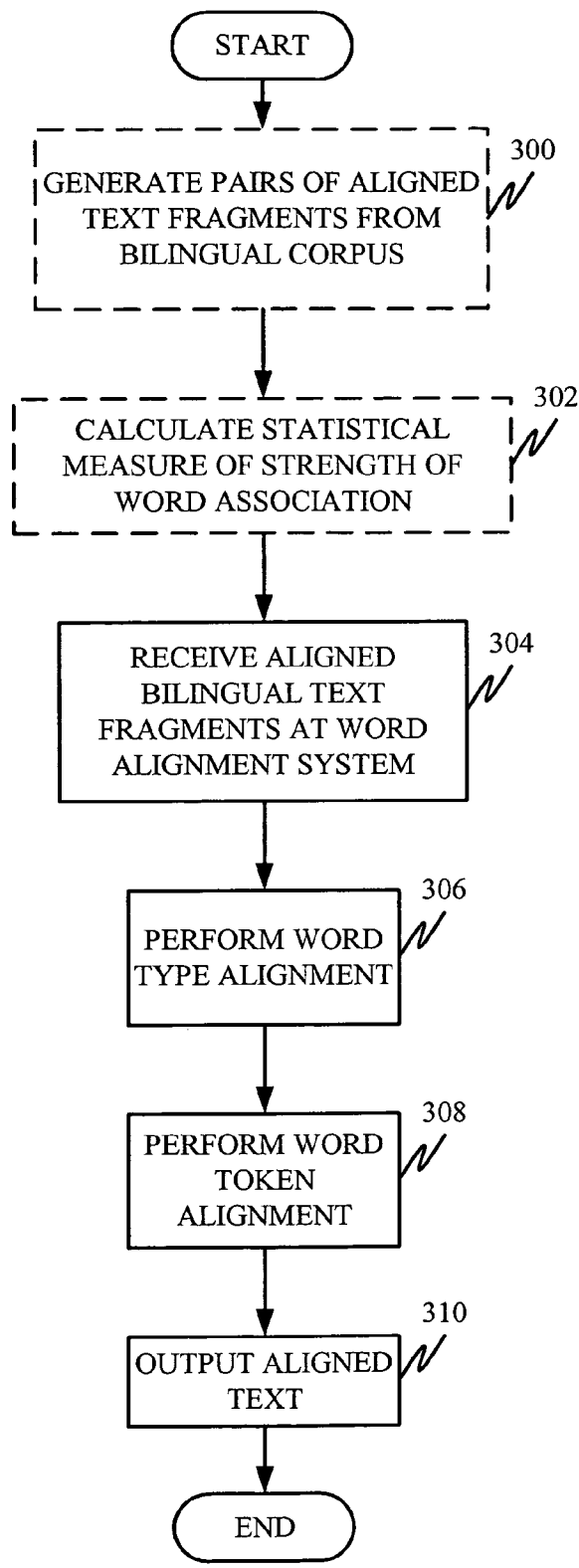
FIG. 3 is a flow diagram illustrating the general overall operation of the system shown in FIG. 2.

In any case, FIG. 3 is a flow diagram illustrating the overall operation of system 200 shown in FIG. 2. Bilingual corpus 210 illustratively includes bilingual data in which text in the first language is found, along with a translation of that text into a second language. For instance, using the English and French languages as an example, bilingual corpus 210 will illustratively include a relatively large volume of English language text along with a French translation of that text.

Text fragment alignment component 208 first accesses bilingual corpus 210 to generate pairs of aligned text fragments from bilingual corpus 210. This is illustrated by block 300 in FIG. 3. In one illustrative embodiment, the text fragments are sentences, although the text fragments could be other fragments, such as clauses, etc.

Either text fragment alignment component 208 or a different component, then illustratively calculates values of a statistical measure of the strength of word associations in the text fragment-aligned data. These values are referred to as word association scores and are illustrated by block 216 in FIG. 2. Calculating these values for the statistical measure is indicated by block 302 in FIG. 3, and in one embodiment, the statistical measure comprises the log likelihood ratio scores discussed above. Of course, other statistical measures can be used as well, such as conditional probabilities discussed in greater detail below with respect to FIG. 4B.

Word alignment system 202 receives the aligned text fragments 218 and 220. This is indicated by block 304 in FIG. 3. Word type alignment component 204 then accesses word association scores 216 and performs word type alignment on the aligned text fragments 218 and 220. This is indicated by block 306 in FIG. 3.

Word type alignments are distinguished in the present discussion from word token alignments. If one of the aligned text fragments has two instances of the same word, a word type alignment does not distinguish between those two instances in the alignment, whereas a word token alignment actually distinguishes between the different instances of the same word in an aligned text fragment pair, in order to perform word alignment. Therefore, for example, assume that the English word "go" has a corresponding French translation. However, if the word "go" appears twice in an English sentence, word type alignment will not indicate which instance of the word "go" is translated by which instance of the French translation in the pair of text fragments. In that case, the word "go" is referred to as the word type, whereas a specific instance of the word "go" in the English text fragment is referred to as a word token. Word token alignment will provide an indication as to which specific instance of the word "go" corresponds to which specific instance of the French translation in the French text fragment.

Therefore, after word type alignment component 204 performs word type alignment, word token alignment component 206 performs word token alignment. This is indicated by block 308 in FIG. 3. The word token-aligned text fragments 230 are then output by word alignment system 202 and they can be used by a machine translation training system 212 in training bilingual word alignment models, or they can be output directly to a machine translation system 214 which can use the word token-aligned text fragment in translation. Of course, the word token-aligned text fragments 230 can be output to any other system as well.

It should also be noted that word token-aligned text fragments 230 need not be output as aligned text fragments. Instead, in one embodiment, word alignment system 202 may only output an indication of the word token alignments indicated by block 232 in FIG. 2. For instance, word alignment system 202 may provide at its output, instead of two text fragments with word tokens aligned, just a set of data indicating that certain words in the English language have been aligned with certain words in the French language. In any case, outputting the aligned text (or another indication of the aligned text) is indicated by block 310 in FIG. 3.

Figure 4A:
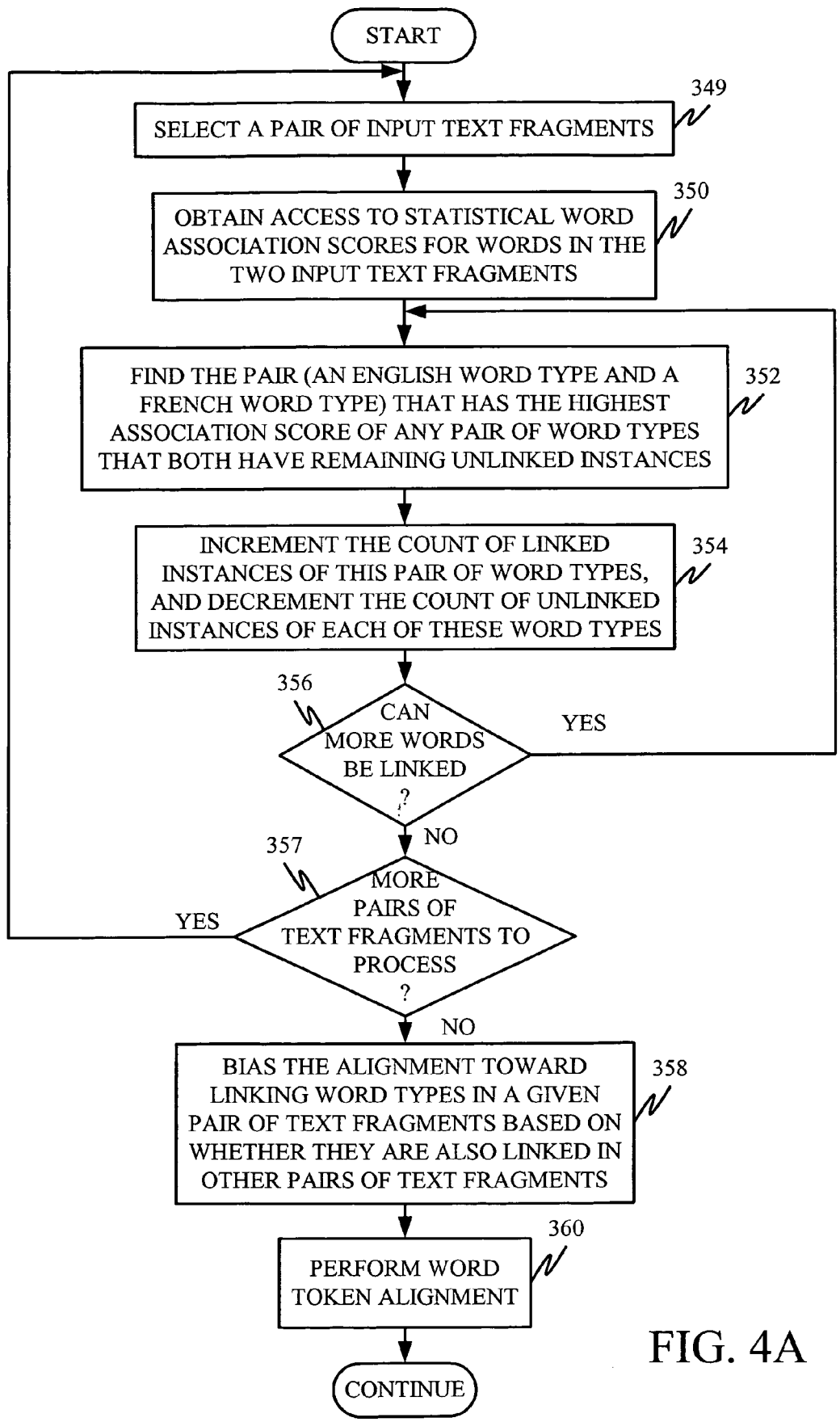
FIG. 4A is a flow diagram illustrating one embodiment for generating word alignments.

FIG. 4A is a flow diagram illustrating in more detail one embodiment by which word type alignment component 204 performs word type alignment on the input text fragments. First, component 204 selects a pair of text fragments for processing. This is indicated by block 349. Component 204 then accesses word association scores 216 for the words in the two selected input text fragments. This is indicated by block 350 in FIG. 4.

Component 204 then finds the pair of word types in the text fragments that has the highest association score of any pair of word types that both have remaining unlinked (unaligned) instances in the text fragments. For instance, if one of the text fragments is in the English language and another is in the French language, component 204 finds a pair of words (that comprises an English word type and a French word type) that has the highest association score of any pair of word types where those two word types have remaining instances not yet linked to anything in the text fragments. Identifying this pair of word types is indicated by block 352 in FIG. 4A.

Component 204 then increments a count of linked instances of this pair of word types and decrements a count of unlinked instances of each of these word types. This is indicated by block 354 in FIG. 4A.

Component 204 then determines whether any more words in the input text fragments can be linked. This is indicated by block 356. If so, component 204 continues processing at block 352 where the next pair of word types with unlinked instances having the highest word association scores is identified. This could be the same pair of word types as were just linked, if more instances of those types remain unlinked, or it could be a different pair with the next highest association score having unlinked instances. The count of linked instances of the word types is increased while the count of unlinked instances is decreased as is shown in block 354.

This continues until no more words can be linked in the pair of text fragments at block 356. In one embodiment, no more words can be linked when either there are no more unlinked words in one of the text fragments, or there are no association scores (or none that meet a minimum threshold) for words in the text fragments that remain unlinked.

When no more words can be linked in the selected pair of input text fragments, component 204 determines whether any more text fragment pairs need to be processed. This is indicated by block 357. Component 204 repeats the steps in blocks 350-356 for each text fragment pair to be processed.

The steps in blocks 350-356 in FIG. 4A that are performed to link unlinked words based on scores is referred to as competitive linking. This is currently done in some systems. The reason it is referred to as "competitive" is that word types compete with one another based on a score (in this case word association score) to determine when, and to what other word types, they are linked.

While the process of competitive linking, thus far, makes alignment decisions for word types in the text fragment pair, it does so independently of the decisions for those same word types in other text fragment pairs. It turns out, however, that it may be desirable to bias the word type alignment toward linking words in a given pair of text fragments that are also linked in many other pairs of text fragments. Therefore, in accordance with one embodiment of the present invention, word type alignment component 204 biases the alignment toward linking word types in a given pair of text fragments when they are also linked in other pairs of text fragments. This is indicated by block 358 in FIG. 4A. Once the word types have been thus linked, word token alignment is performed as indicated by block 308.

Figure 4B:
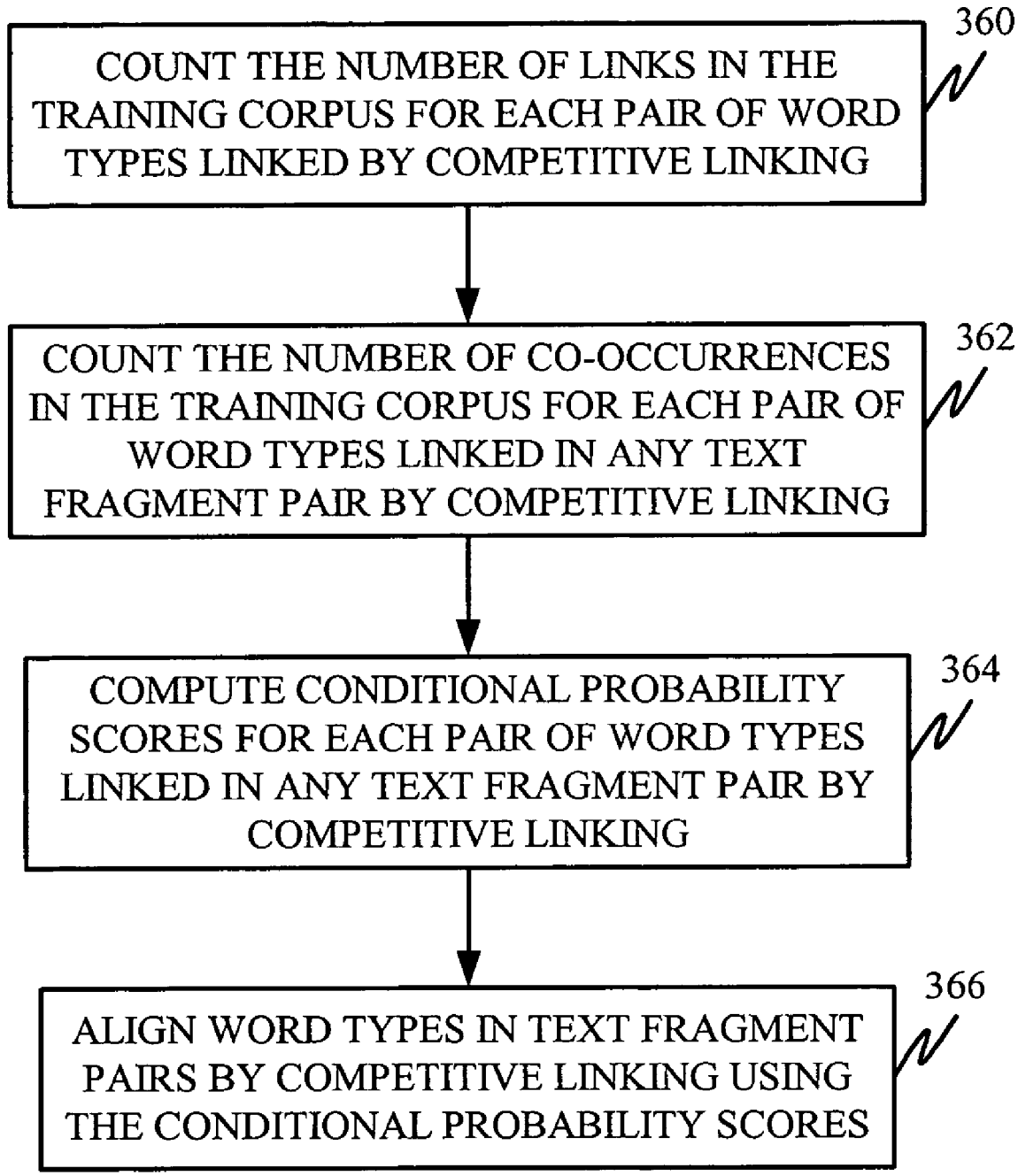
FIG. 4B is a flow diagram illustrating an embodiment in which word type alignment is performed based on whether word types are aligned in more than one pair of text fragments.

FIG. 4B is a flow diagram illustrating one embodiment in which word type links are biased toward linking a pair of word types that have also been linked in other pairs of text fragments, as discussed with respect to block 358 in FIG. 4A. First, component 204 counts the number of links in the training corpus for each pair of word types linked by competitive linking (i.e., linked by the process shown in blocks 350-356 in FIG. 4A). This is indicated by block 360 in FIG. 4B. In other words, in each pair of word types that were ever linked by competitive linking, component 204 counts the number of those links for that word pair.

Component 204 then counts the number of co-occurrences in the training corpus for each pair of words linked in any text fragment pair by competitive linking. This is indicated by block 362 in FIG. 4B. In other words, component 204 goes back to the bilingual sentence-aligned corpus and counts the number of times that each of the word types co-occurred in aligned text fragments (e.g., sentences) in the corpus. Therefore, at this point, component 204 has the count of the number of times two word types were actually linked in competitive linking, as well as the count of the number of times those two word types co-occurred in aligned text fragments, regardless of whether they were linked during competitive linking.

Using these numbers, component 204 computes conditional probability scores for each pair of word types linked in any text fragment pair by competitive linking. In some current systems, conditional probabilities are used, but without competitive linking. This is indicated by block 364 in FIG. 4B.

There are a number of different ways in which these conditional probability scores can be estimated. One embodiment for estimating the conditional probability is by estimating a link probability (LP) as follows:

$$LP(f, e) = \frac{links_1(f, e)}{cooc(f, e)} \quad \text{Eq. 2}$$

Where $links_1$ (f, e) is the number of times the word represented by f and the word represented by e are linked according to competitive linking, and cooc (f, e) is the number of times f and e co-occur in aligned text fragments. In cases in which f or e (or both) have more than one occurrence in a given text fragment pair, the co-occurrence can be counted in a number of different ways. In one embodiment, the co-occurrences of f and e in a text fragment pair are counted as the greater of the number of occurrences of f and the number of occurrences of e, if both f and e occur; otherwise, the number of co-occurrences is zero.

Once the conditional probability scores are computed for each pair of word types, component 204 re-runs the competitive linking process using the conditional probability scores, instead of the original statistical word association scores. Thus, component 204 aligns word types in the text fragment pairs using competitive linking based on the conditional probability scores as indicated by block 366 in FIG. 4B.

In one embodiment, performing competitive linking based on the LP scores shown in Equation 2 is performed using an LP threshold of 0.215, below which a link is not made between a pair of word types. Of course, this threshold can be changed, and it may illustratively reflect the developer's or user's decision with respect to a trade off between precision and recall in generating links between word types.

In accordance with another embodiment of the invention, computation of the conditional probability scores is modified to better account for rare links. In other words, using the conditional probability set out in Equation 2, if a French word and an English word co-occurred in a pair of text fragments only once, but they happened to be linked by competitive linking using the statistical word association scores, then the estimate of the link probability in Equation 2 would be 1.0, which is the highest possible value for the link probability. The link probability would also be 1.0 if those two words co-occurred 100 times and were linked based on word association scores and competitive linking all 100 times. However, it may be desirable to compute a higher link probability if the two words co-occurred 100 times and were always linked, than if the two words only co-occurred once and happened to be linked that one time.

Therefore, in accordance with one embodiment, the conditional probability score is estimated somewhat differently than that shown in Equation 2. It is estimated by applying an absolute discount as illustratively by d in $LP_d$ shown in Equation 3:

$$LP_d(f, e) = \frac{links_1(f, e) - d}{cooc(f, e)} \quad \text{Eq. 3}$$

It can be seen that Equation 3 calculates $LP_d$ similarly to LP shown in Equation 2, except that a fixed discount d is subtracted from each link count. The value of d can be empirically determined, but in one embodiment, d is set to be in a range of approximately 0.7-0.9, and may illustratively be 0.9.

Of course, changing the value of d within that range, or even outside that range, may simply be determined based on a precision/recall trade off desired by the developer or user of the system.

Again, in one embodiment, performing competitive linking based on the $LP_d$ values is done using a threshold $LP_d$ value of 0.184, below which links are not made between word types. The developer or user of the system can change the $LP_d$ threshold based on any desired trade off between precision and recall in generating links between word types.

It should be noted that alternative embodiments may use any monotonic function of LP or $LP_d$ scores, such as the logarithms or negative logarithms of these scores.

Figure 4C:
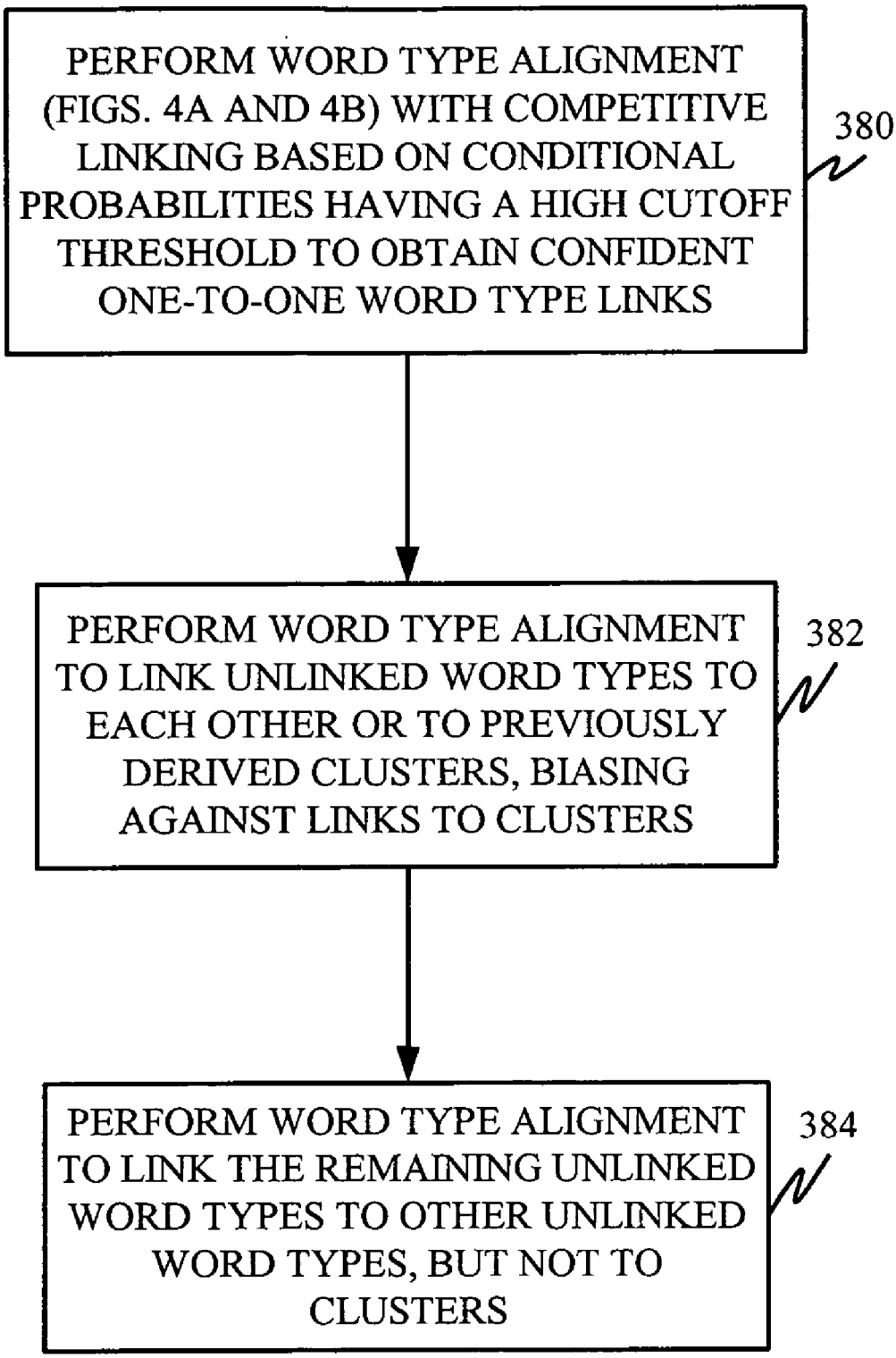
FIG. 4C is a flow diagram illustrating how words can be linked to clusters.

To this point, the word type alignment system is described with respect to performing one-to-one word type alignments. In other words, if the aligned text fragments are in the English and French languages, the system will identify links between a single English word and a single French word in the text fragments. Of course, this is not always accurate in language translation. One example where this one-to-one alignment is not accurate is negation. In English, negation may be designated by the word "not" while that is often translated in the French language as the words "ne . . . pas". Therefore, it may be desirable to enable the system to identify many-to-one alignments and one-to-many alignments. FIG. 4C is a flow diagram illustrating how the system can be used to accommodate such alignments. The system basically uses three separate iterations of the process illustrated in FIG. 4A.

In accordance with the embodiment shown in FIG. 4C, component 204 performs a first iteration of word type linking (or alignment) as discussed with respect to FIGS. 4A and 4B, biasing the word type alignment toward linking word types in a given pair of text fragments based on whether they were also linked in other pairs of text fragments. Performing this word type alignment is indicated by block 380 in FIG. 4C. During this initial pass of the word type alignment process, a relatively high threshold is used during the phase of competitive linking in which the LP or $LP_d$ conditional link probabilities are used. This ensures that the one-to-one word type links generated by the processing of block 380 are quite confident links, and are therefore quite likely accurate. The threshold can be empirically determined.

Because the threshold is set so high during initial word type linking in block 380, a relatively large number of words in the text fragments will remain unlinked. Thus, after performing word type alignment in block 380, there remain three bags of words. By a bag of words it is meant a multi-set which is similar to a set mathematically, except that the bag can have more than one instance of the same token. Thus, the three bags of words after processing at block 380 include a bag of unlinked English words, a bag of unlinked French words, and a bag of English word and French word linked pairs.

The next iteration in FIG. 4C is to perform word type linking as shown in FIGS. 4A and 4B between the bag of unlinked French words and the bag of unlinked English words, between the bag of unlinked French words and the bag of linked pairs, and between the bag of unlinked English words and the bag of linked pairs. Thus, a generalized form of the competitive word type linking process shown in FIGS. 4A and 4B is performed in order to attempt to link the unlinked words to one another or to the previously derived bilingual clusters (word types linked to one another in the bag of linked words).

However, it turns out that the competitive word type linking process shown in FIGS. 4A and 4B is applied to clusters, it tends to link words to clusters too often, when it should actually be producing one-to-one alignments. Actual translation tends to be nearly one-to-one, especially with closely related languages. Therefore, in one embodiment, performing the word type linking to link unlinked word types to each other or to the previously derived clusters is biased against links to clusters. This is indicated by block 382 in FIG. 4C.

In accordance with one embodiment of biasing, during the first pass of competitive linking in Block 382, the word association scores between words and clusters in the competitive linking pass are discounted. Therefore, using the word association scores to generate a cluster requires component 204 to find a substantially stronger association for a given word to a cluster than to any other unlinked word.

In another embodiment, the threshold for generating links between unlinked words and clusters using the link probability (LP) (or the link probability with the absolute discount applied $LP_d$) is set higher than the threshold used to link unlinked words to other unlinked words. Therefore, during the pass of word type linking using conditional probabilities in block 382, either word association scores for associating a word with a cluster or the link probability scores for associating a word with a cluster, or both, are set in order to bias in favor of word-to-word links over word-to-cluster or cluster-to-word links.

At this point, there have been two iterations of word type alignment performed, one of which only allows word-to-word links that was performed with a high threshold (block 380), and the other of which allows both word-to-word links and links between words and clusters (block 382). However, due to the relatively high thresholds used in these two iterations of word type linking, there will still likely remain a large number of unlinked words.

Therefore, component 204 performs a third iteration of word type linking to link the remaining unlinked word types to other unlinked word types, but not to clusters. This is indicated by block 384 in FIG. 4C. In this third iteration of the process shown in FIGS. 4A and 4B, the threshold for the link probability (either with or without the discount) is set relatively low as component 204 attempts to make single word-to-word type links.

In sum, it can thus be seen that the process illustrated in FIG. 4C performs three iterations of the process shown in FIG. 4A. The first iteration looks for one-to-one word type alignments using a relatively high link probability threshold to obtain word type alignments that are quite accurate. The second iteration allows unlinked words to be linked to one another or to previously derived clusters, but the iteration biases against linking words to clusters so that they are only linked in that way when the system is relatively confident that the unlinked words should be linked to a cluster. In the final iteration, unlinked words are again allowed to be linked to other unlinked words, and the link probability threshold is lowered to allow more unlinked words to be linked.

The thresholds in the three various iterations can be empirically determined or determined in another way, as desired. In accordance with one embodiment, the link probability threshold for the first iteration (with or without the discount) is set to be approximately 0.7. In the second iteration, the discount on LLR for linking an unlinked word to a cluster is set to approximately 2000 for a corpus of 500,000 text segment pairs and the link probability threshold is again set to approximately 0.7. In the final iteration, the link probability threshold is set to approximately 0.188. Of course, as discussed above, these thresholds are exemplary only and substantially any thresholds can be used given the developer's or user's desired trade off between precision and recall in generating word type alignments.

The embodiment depicted in FIG. 4C can result in one-to-two word alignments and two-to-one word alignments, in addition to one-to-one word alignments. In other embodiments block 382 may be repeated as many times as desired, in order to obtain more complex alignments. In some of these embodiments, block 384 is repeated after every iteration of block 382, while in others, a single iteration of block 384 is performed after all iterations of block 382 have been completed.

Having now discussed a number of embodiments by which word type alignments can be generated, a word token alignment must be chosen for a given word type alignment. In choosing a word token alignment, word token alignment component 206 (shown in FIG. 2) chooses particular instances of words in the aligned text fragments to link to one another, consistent with the word type alignment chosen by word type alignment component 204.

Of course, it should be noted that, in accordance with one embodiment of the present invention, any of the word type alignment methods discussed above can be used, and, where multiple word token alignments are generated for a given word type alignment, one of the word token alignments can be chosen at random. However, in accordance with one embodiment, one of the word token alignments for a given word type alignment is chosen in a more principled way.

In order to select a word token alignment, one embodiment uses word position. Translating text from one language to another language often involves rearranging the order of words. For example, in the English language, adjectives usually precede the noun they modify, while in the French language adjectives often follow the noun. However, very often, words are in the same order in French and in English, and even when they are in a different order, the order usually does not change very much from one language to the other.

Therefore, in order to choose how to align instances of words in a given word type alignment, one embodiment of the present invention uses a measure of monotonicity. Mathematically, a function of x is monotonically increasing if every time x increases, y increases as well. For purposes of the present discussion, the function that maps a position of a word in an English text into the position of the corresponding word in the French text is monotonic if, every time the position of the English word increases, the position of the corresponding French word also increases.

Figure 5A:
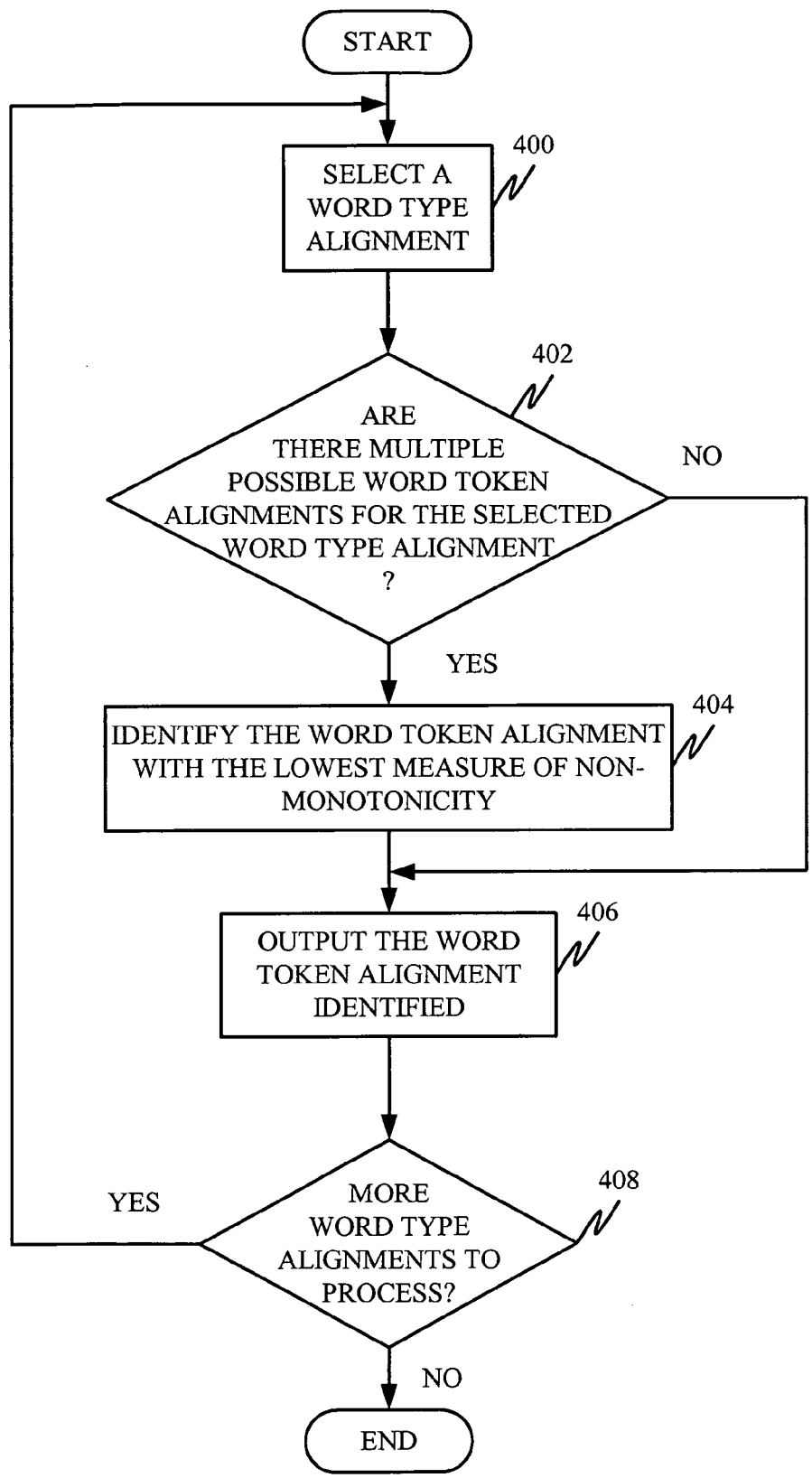
FIG. 5A is a flow diagram illustrating one embodiment of word token alignment.

In one embodiment, it is easier to measure monotonicity in terms of its opposite measure, non-monotonicity, or the degree to which the word position mapping is non-monotonic. Thus, in order to choose one of the various word token alignments for a given word type alignment, word token alignment component 206 measures the non-monotonicity of each of the various word token alignments and chooses the one with the lowest degree of non-monotonicity. This is described in greater detail in the flow diagram shown in FIG. 5A.

First, token 206 chooses a word type alignment. This is indicated by block 400 in FIG. 5A. Component 206 then determines whether there are multiple possible word token alignments for the selected word type alignment. This is indicated by block 402. If not, that means that, for the selected word type alignment, there has only been one word token alignment generated, and processing skips to block 406 where the word token alignment is identified as the best word token alignment for the selected word type alignment.

However, if, at block 402, component 206 determines that there are multiple word token alignments for the selected word type alignment, then component 206 identifies the word token alignment with the lowest measure of non-monotonicity. This is indicated by block 404 in FIG. 5A. That word token alignment is then identified and output as indicated by block 406.

Word token alignment component 206 then determines whether there are more word type alignments to process. This is indicated by block 408. If so, processing reverts to block 400, where another word type alignment is selected. If not, word token alignments have been identified for each word type alignment under analysis. For the sake of example, Table 1 shows an English text fragment having three words and a corresponding French text fragment having five words. The word position for each of those words is also shown in Table 1. Therefore, the aligned text fragments comprise the English text fragment aligned with its French translation, the French text fragment.

TABLE 1

| | WORD POSITION | | | | |
|---|---|---|---|---|---|
| | 1 | 2 | 3 | 4 | 5 |
| ENGLISH WORDS | WORD1 | WORD2 | WORD3 | | |
| FRENCH WORDS | WORD1 | WORD2 | WORD3 | WORD4 | WORD5 |

In accordance with one embodiment, component 206 first identifies one of the languages in the selected word type alignment as the source and the other language as the target. This is indicated by block 410 in FIG. 5B. Component 206 then selects one of the word token alignments corresponding to the selected word type alignment. This is indicated by block 412 in FIG. 5B. Table 2 shows an example of two different word token alignments corresponding to the word type alignment involving the English and French words in Table 1.

TABLE 2

| WORD TOKEN ALIGNMENT 1: | (1, 1) (2, 4) (2, 5) (3, 2) |
|---|---|
| WORD TOKEN ALIGNMENT 2: | (1, 5) (2, 1) (2, 4) (3, 2) |

The word token alignment 1 in Table 2 has four terms. The first number in each term represents the word position of the source language word, and the second number in each term represents the word position of the target language term. Therefore, word token alignment 1 in Table 2 shows that word 1 in the English text fragment is aligned with word 1 in the French text fragment. Word 2 in the English text fragment is aligned with word 4 in the French text fragment, and word 2 in the English text fragment is also aligned with word 5 in the French text fragment. Finally, word 3 in the English text fragment is aligned with word 2 in the French text fragment.

Word token alignment 2 shown in Table 2 is identified similarly. Word token alignment 2 shows that word 1 in the English text fragment is aligned with word 5 in the French text fragment; word 2 in the English text fragment is aligned with words 4 and 1 in the French text fragment; and word 3 in the English text fragment is aligned with word 2 in the French text fragment. Thus, at block 412 in FIG. 5B, component 206 first selects word token alignment 1 in Table 2 for the calculation of non-monotonicity.

Component 206 then sorts the selected word token alignment (word token alignment 1) by word position in the source language. This is indicated by block 414 in FIG. 5B. Table 2 shows that the word token alignment 1 already has the terms sorted, in ascending order, based upon the word position of the source language (based on the word position of the English words). The first numbers in each of the number pairs are arranged in ascending order.

Word token alignment component 206 then sorts any terms in word token alignment 1 having the same source language word position by word position in the target language. For instance, word token alignment 1 in table 2 shows that there are two French words aligned to the English word in word position 2. The French word in position 4 and the French word in position 5 are both aligned to the English word in position 2. Thus, in order to sort those two terms in word token alignment 1, they are sorted based on the French word position. Table 2 shows that the terms are already sorted based on the French word position, because the term (2, 4) is listed before the term (2, 5). Sorting by word position in the target language is indicated by block 416 in FIG. 5B.

Once the terms in the selected word token alignment are sorted, the non-monotonicity for the selected word token alignment is calculated. In accordance with one embodiment, the non-monotonicity is calculated as the sum of differences in target word position, where a lower word position number follows a higher word position number. When a lower target word position follows a higher word position, this is referred to herein as a target word position inversion.

For instance, discarding the source word position from the terms in word token alignment 1 leaves the following target language word position numbers: 1, 4, 5, 2. Having extracted this sequence, non-monotonicity is calculated by looking for places where a lower number follows a higher number (i.e., an inversion). With respect to word token alignment 1, the only place where this occurs is where the number 2 follows the number 5. In other words, 1 is followed by 4, and 4 is a higher number than 1. The number 4 is followed by 5, and 5 is a higher number than 1. However, 5 is followed by 2, which is a lower number than 5. In accordance with the present embodiment, the measure of non-monotonicity is simply the sum of the differences where such an inversion takes place.

Since the only instance where a higher number is followed by a lower number is the instance where 5 is followed by 2, the sum of the difference for word token alignment 1 is 5−2=3. Thus, the measure of non-monotonicity for word token alignment 1 is 3. Calculating non-monotonicity as the sum of these differences is indicated by block 418 in FIG. 5B.

Component 206 then determines whether there are more word token alignments for the selected word type alignment. This is indicated by block 420 in FIG. 5B. Table 2 shows that there is a second word token alignment 2. Thus, word token alignment 2 is selected by component 206 and it is ordered first by the source word positions and then, if two target words are aligned with any one given source word, those terms are aligned secondarily based on the target word position. It can be seen again from Table 2 that word token alignment 2 is already ordered in the proper way.

Discarding the source language word positions leaves the sequence 5, 1, 4, 2. From this sequence, it is clear that there are two target word position inversions, at 5, 1 and 4, 2. The difference between 5 and 1 is 4 and the difference between 4 and 2 is 2. Therefore, the sum of the differences indicative of non-monotonicity is 6 for word token alignment 2.

In the present embodiment, the measures of non-monotonicity for the two word token alignments are different, and the non-monotonicity for word token alignment 1 is less than the non-monotonicity for word token alignment 2. Thus, word token alignment 2 is best. However, it may happen that the non-monotonicity for two different word token alignments is the same. Component 206 thus determines whether more than one word token alignment has a lowest non-monotonicity. This is indicated by block 422 in FIG. 5C.

If there is only one word token alignment with the lowest non-monotonicity, then that word token alignment is identified as the proper word token alignment. This is indicated by block 424 in FIG. 5C.

If, however, at block 422, there is more than one word token alignment that has the lowest non-monotonicity score, then component 206 calculates a tiebreaker. Component 206 examines all of the word token alignments that are tied with the lowest non-monotonicity score and counts the number of target word position inversions (the number of times that a higher target word position is followed by a lower target word position) in each word token alignment. Component 206 then illustratively chooses as the proper word token alignment, that word token alignment with the fewest number of target word position inversions. Thus, component 206 illustratively chooses a word token alignment that has fewer, if larger, target word position inversions over a word token alignment that has more, but smaller, target word position inversions. The tiebreaker is indicated by block 426 in FIG. 5C.

If, even after the tiebreaker, the word token alignments are still tied with respect to non-monotonicity and the number of inversions, then one of them can illustratively be selected at random, or further tiebreaker mechanisms can be used.

Figure 5B:
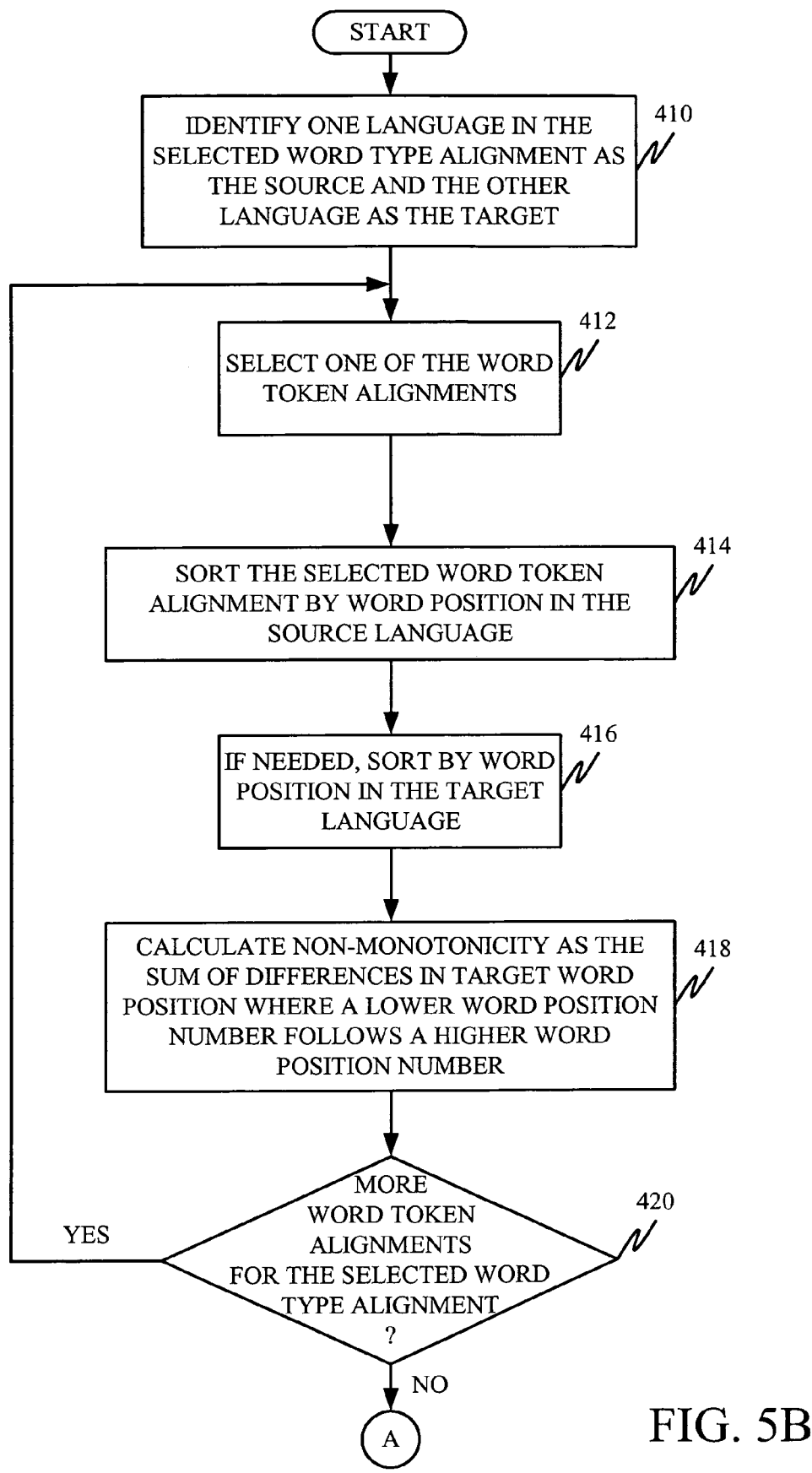
FIGS. 5B and 5C illustrate a more detailed embodiment of how word token alignment is performed based on non-monotonicity.
Figure 5C:
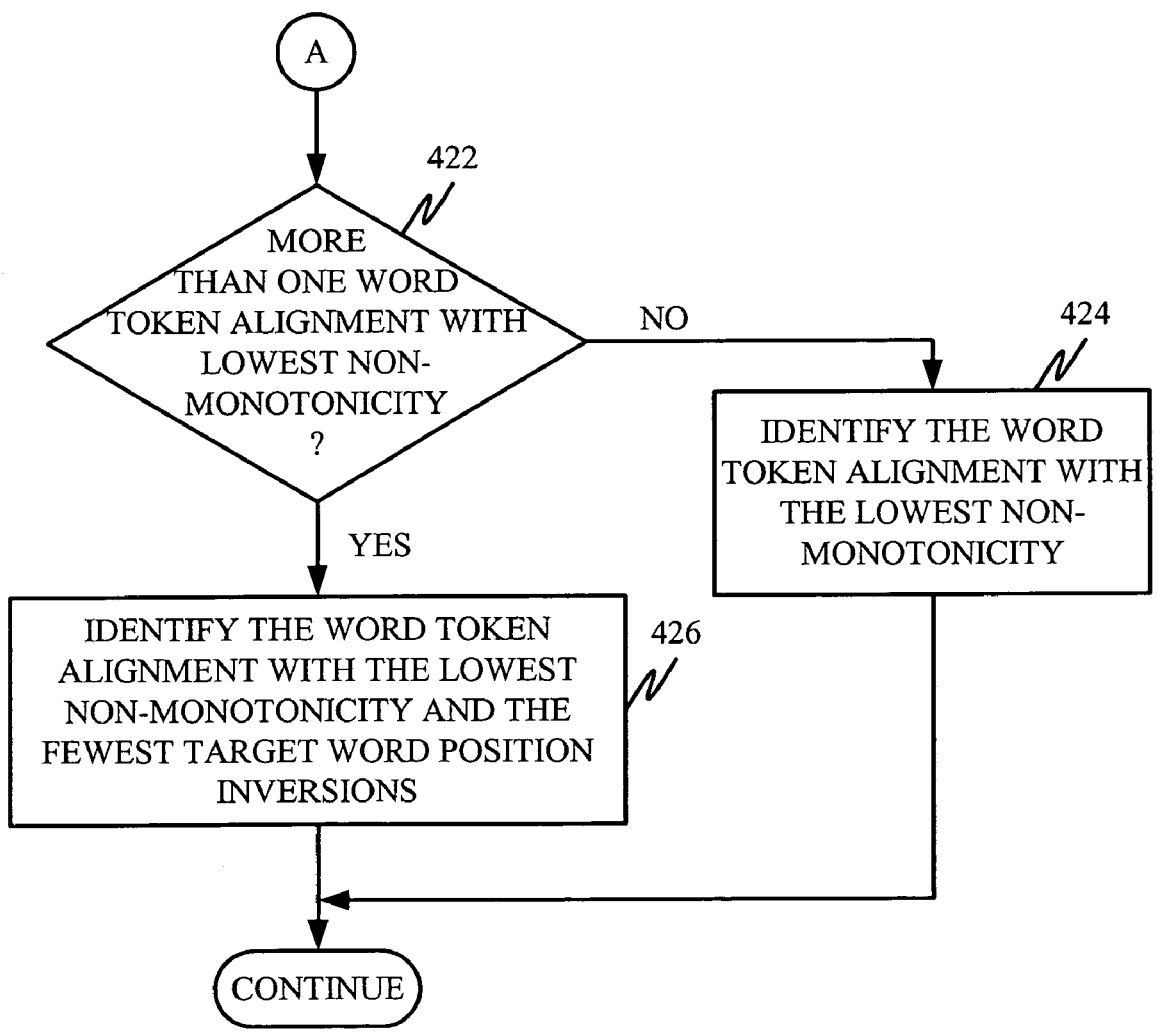
Figure 5D:
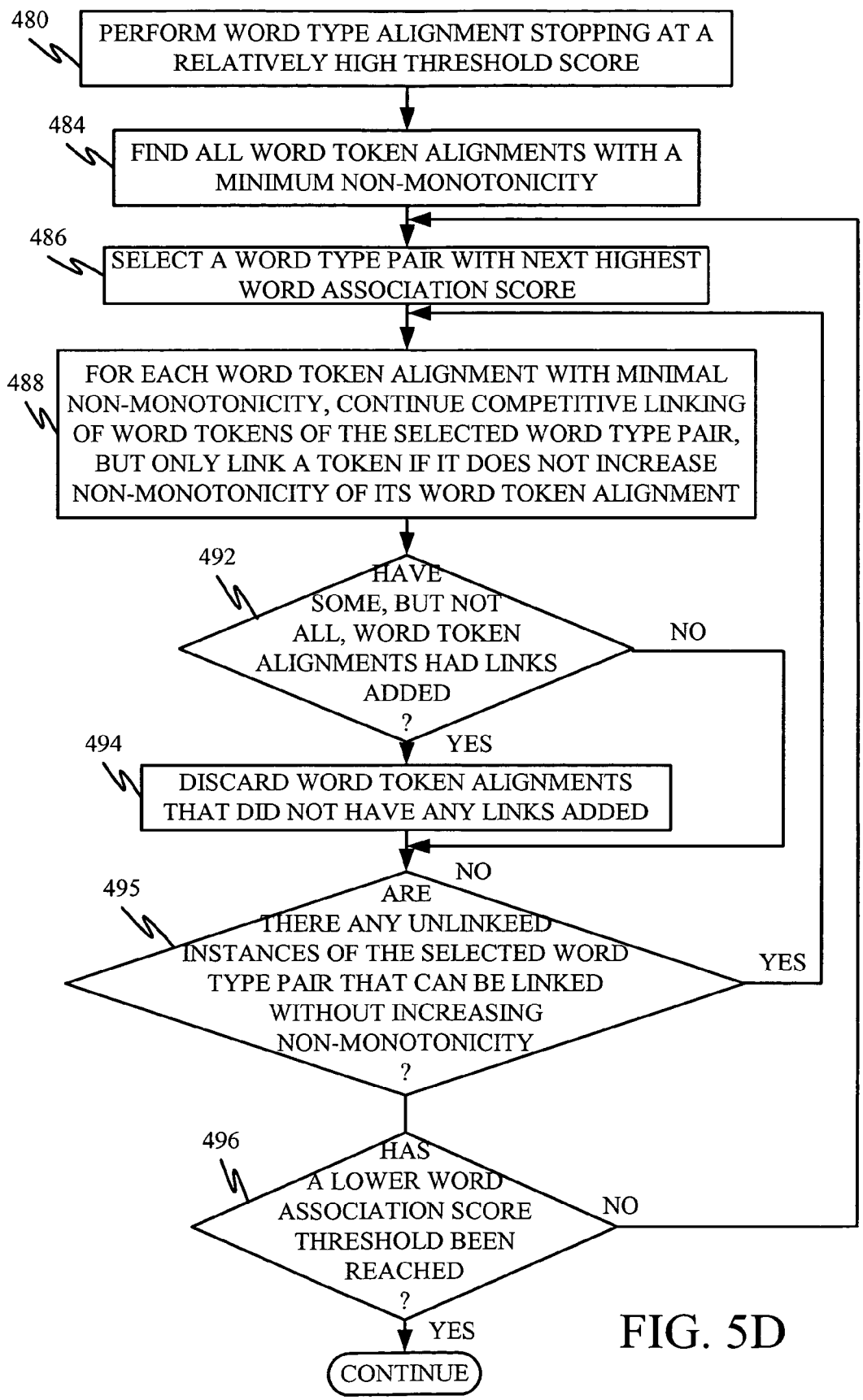
FIG. 5D is a flow diagram illustrating another embodiment in which word token alignment is performed based on non-monotonicity.

FIG. 5D illustrates another method for incorporating non-monotonicity in order to choose a word token alignment for a given word type alignment. The method shown in the flow diagram of FIG. 5D can be performed by word type alignment component 204 or word token alignment component 206, or a combination of the two. The method shown in FIG. 5D incorporates calculation of non-monotonicity earlier in the process, in generating word type alignments and word token alignments.

System 202 thus first computes a word type alignment in a manner such as that shown in FIG. 4A or FIG. 4C, using a relatively high link probability threshold. This is indicated by block 480 in FIG. 5D. This will leave a relatively large number of words unlinked.

System 202 then finds all word token alignments for the computed word type alignment with the minimum degree of non-monotonicity. This is indicated by block 484 and can be computed using any of the non-monotonicity measurements discussed thus far, or a different non-monotonicity measurement. System 202 then selects the word type pair with the next highest word association score, as indicated by block 486 in FIG. 5D. That is, system 202 picks a particular pair of words that remain unlinked in the set of possible word token alignments for this text segment pair.

Next, for each word token alignment remaining under consideration, competitive linking is continued for word tokens of the selected word type pair, but the tokens are only linked if the link does not increase non-monotonicity of the word token alignment. This is indicated by block 488 in FIG. 5D. In other word, once the cutoff threshold has been reached in the initial word type alignment pass, competitive linking is continued below that threshold, choosing which words to align to which other words, but also committing to the alignment of particular word instances. However, word instances are only linked to one another (or aligned to one another) if that can be done without increasing the non-monotonicity of the word token alignment. Therefore, the word instance links that would be linked using a lower cutoff threshold in the linking algorithm are only created if they do not create any additional target word position inversions.

Once adding links of the selected word type pair to all word token alignments remaining under consideration been attempted, system 202 determines whether some, but not all, of these word token alignments had a link added to them. This is indicated by block 492 in FIG. 5D. If so, then any word token alignments that did not have any links added are discarded. This is indicated by block 494.

Generating alignments using the selected word type pair is continued until there are no longer any unlinked instances of the selected word types in one or the other text fragments, or until no more links can be made without increasing the non-monotonicity of the word token alignments. This is indicated by block 495 in FIG. 5D.

If, at block 495 it is determined that there are no longer any unlinked instances of the selected word types in one or the other text fragments, or no more links can be made without increasing the non-monotonicity of the word token alignments, then system 202 determines whether more word type pairs need to be processed. In doing so, system 202 can illustratively determine whether there are any remaining word type pairs, that have not been processed, that have a word association score that exceeds a predetermined threshold level. This is indicated by block 496 in FIG. 5D. If the lower threshold has not been reached, that means that another word type pair with a lower word association score can be processed, and processing reverts back to block 486. If the threshold has been reached, however, then processing is concluded.

The result of the process shown in FIG. 5D is that non-monotonicity is factored in to generating word token alignments, which allows safely adding word type pairs with lower association scores than can be done if non-monotonicity is disregarded.

Figure 5E:
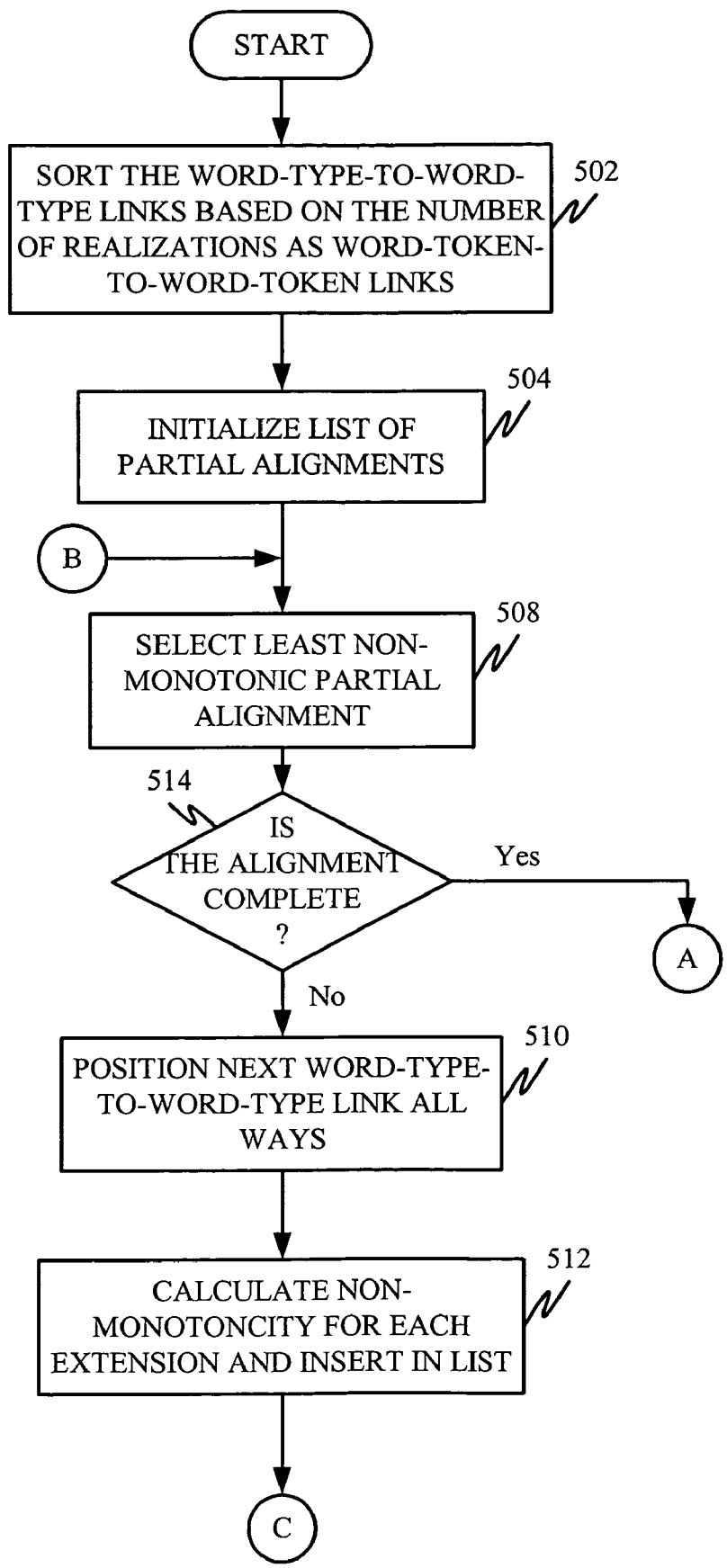
FIGS. 5E and 5F illustrate a flow diagram of another embodiment in which word token alignment is performed based on non-monotonicity.
Figure 5F:
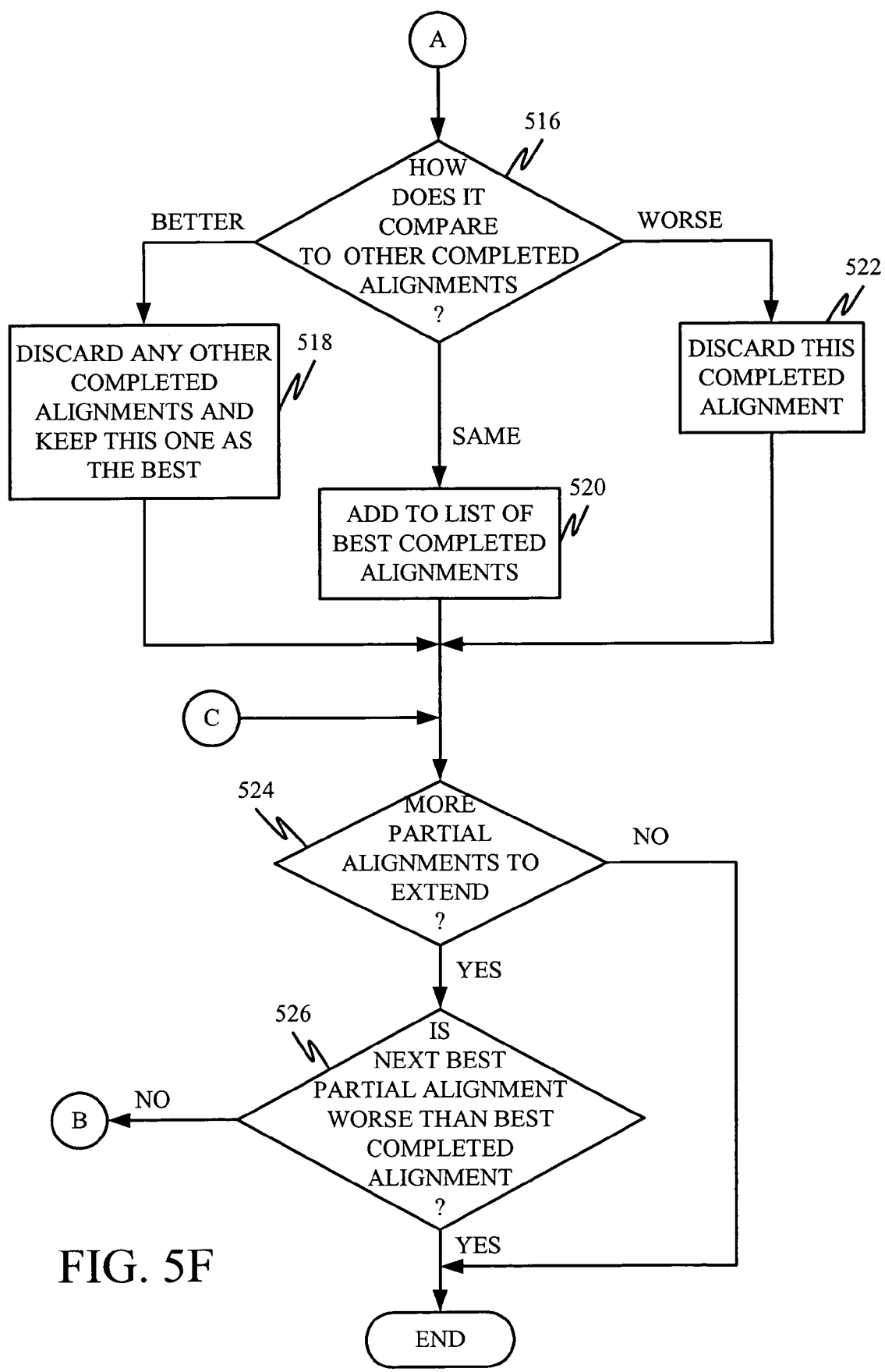

While FIGS. 5B-5D illustrate different ways for performing token alignment, in some instances it can be computationally expensive to enumerate every token alignment for a given type alignment. For instance, in long sentences, the number of different combinations of token alignments for a given type alignment can be excessively large. Therefore, in accordance with one embodiment, FIGS. 5E and 5F illustrate that a least non-monotonic word token alignment can be found by an incremental best-first search over partial word token alignments maintained in a priority queue, sorted by non-monotonicity.

In order to perform such an incremental best-first search, for a given word type alignment, the specific word-type-to-word-type links are sorted in ascending order based on the number of possible ways that they can be realized in terms of word-token-to-word-token links. This is indicated by block 502 in FIG. 5E.

A list of partial word type alignments is then initialized. In order to initialize the list, the partial word token alignment that includes all and only word-type-to-word-type links that can be realized in only one way is placed in the list. In other words, where there is only one instance in a text fragment pair of each of the word types involved in the link, that link is included in the partial alignment used to initialize the list. Initializing the list of partial alignments is indicated by block 504 in FIG. 5E.

Then, additional partial alignments are generated and placed in the list. In order to generate these alignments, particular word token links are chosen incrementally, going through the sorted list of word-type-to-word-type links, so that positions for alignments that have fewer possibilities are chosen, before those that have more possibilities. At all times while partial alignments are being generated and processed, the list of partial word type alignments is maintained in order, sorted from least non-monotonic to most non-monotonic, keeping track for each partial alignment of how far the alignment has progressed in choosing positions for each word-type-to-word-type link. Processing proceeds by iterating through the list of partial alignments, always choosing the least non-monotonic partial alignment to work on next.

Therefore, the least non-monotonic partial alignment is selected from the list. This is indicated by block 508 in FIG. 5E. If the alignment is actually complete, then its non-monotonicity score is compared to the non-monotonicity score for any other completed alignments. This is indicated by blocks 514 and 516 in FIGS. 5E and 5F. If the non-monotonicity score for the newly completed alignment is better than the previous best-scoring completed alignment (or if it is the first complete alignment found), then any other completed alignments which have been previously found are discarded, and the present complete alignment is stored as the best alignment, so far. This is indicated by block 518 in FIG. 5F.

If the newly completed alignment has the same non-monotonicity score as the previous best alignments completed thus far, then the newly completed alignment is added to a list of best alignments. This is indicated by block 520 in FIG. 5F.

If the newly completed alignment has a non-monotonicity score that is worse than the previously identified best completed alignment, then the newly completed alignment is simply discarded. This is indicated by block 522 in FIG. 5F.

If the selected alignment is not complete at block 514, the next word-type-to-word-type link that must be positioned in that alignment is identified, and the alignment is extended by all ways of positioning that link. This is indicated by block 510 in FIG. 5E.

For each of these extensions, the extension and its non-monotonicity score, computed as described above, are inserted in the list of partial alignments ordered by non-monotonicity score. Calculating the non-monotonicity score for an extension and inserting it in the list is indicated by block 512 in FIG. 5E.

It is then determined whether there are any more partial alignments to extend. This is indicated by block 524 in FIG. 5F. If not, then the currently identified, best completed alignment is the final completed alignment.

However, if there are more partial alignments to extend, then it is determined whether the next best partial alignment is worse than the best completed alignment. This is indicated by block 526 in FIG. 5F. Recall that the partial alignments in the list are sorted based on non-monotonicity. Therefore, simply by examining the next best partial alignment in the list, it can be determined whether any partial alignments in the list have a non-monotonicity that is better than the currently identified, best completed alignment.

The process can stop extending partial alignments once the non-monotonicity score of the best partial alignment remaining on the list of partial alignments is worse than any of the complete alignments already found. This is guaranteed to find the least non-monotonic alignments, because the non-monotonicity score of a partial alignment can never improve by adding more links. It can only stay the same or get worse. Therefore, the process need not enumerate any completions of the remaining partial alignments. However, if there are more partial alignments with a non-monotonicity score that is better than the best completed alignment, then processing continues at block 508 and the next best non-monotonic partial alignment is selected for extension.

It may turn out that the process shown in FIGS. 5E and 5F is still not desirably efficient in finding the least non-monotonic token-to-token alignment for a given type-to-type alignment. In that case, if the number of partial alignments that are being tracked reaches a given threshold, then the least non-monotonic partial alignment still on the list can be selected and greedily extended, choosing the least non-monotonic extension for each additional type-to-type link (rather than considering all possible extensions) until all type-to-type links have been accounted for. If there turns out to be more than one least non-monotonic extension for a given type-to-type link, then the first one that is encountered can simply be chosen.

By way of example, assume that a threshold of 1,000 partial alignments is chosen. In that case, the greedy approximate search is believed to be invoked approximately once in 500 sentence pairs.

It can thus be seen that various embodiments of the invention provide improvements in generating word type alignments from bilingual aligned text fragments. Various other embodiments of the invention provide improvements in word token alignments, given a word type alignment. Of course, various combinations of the different word type alignments and word token alignments provide significant advantages as well.

The present system is faster than many current alignment systems and may even be significantly faster if implemented in a language such as C++. The present system is also relatively simple in that it makes only a fixed number of passes to align words. The calculations performed in each pass are also relatively quick to perform.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of aligning words in pairs of bilingual, aligned text fragments using a computer with a processor, comprising:

linking, with the processor, word types in a plurality of pairs of the aligned text fragments, based on statistical word association scores;

estimating, with the processor, a conditional probability for each pair of word types in a selected pair of aligned text fragments that is linked during the linking step, based on whether the pair of word types is also linked in other pairs of aligned text fragments during the linking step;

generating the word type alignment, with the processor, by linking pairs of word types based on the conditional probability estimated;

wherein linked word types in the word type alignment comprise a cluster, and further comprising, repeating the step of generating a word type alignment for unlinked words in the selected pair of text fragments by linking the unlinked words to other unlinked words or to clusters, by preferentially linking the unlinked words to other unlinked words instead of linking the unlinked words to clusters;

calculating, with the processor, a measure of non-monotonicity for each of a plurality of word token alignments corresponding to the word type alignment;

identifying, with the processor, a word token alignment having a desired measure of non-monotonicity; and outputting a textual input, generated based on the word type alignment and the identified word token alignment, to a translation system.

2. The method of claim 1 wherein estimating the conditional probability comprises:
   estimating the conditional probability to account for rare co-occurrences of the pairs of word types linked in the pairs of aligned text fragments.

3. The method of claim 2 wherein estimating the conditional probability to account for rare co-occurrences comprises:
   applying an absolute discount to a count of a number of times a pair of word types is linked in the pairs of aligned text fragments in the course of estimating the conditional probability.

4. The method of claim 1 wherein the linking step and the step of generating the word type alignment based on the conditional probability are performed using a first probability threshold for the conditional probability estimated, below which word types are not linked during the step of generating the word type alignment.

5. The method of claim 4 wherein preferentially linking the unlinked words to other unlinked words comprises:
   requiring a higher statistical word association score for linking the unlinked words to a cluster than to other unlinked words.

6. The method of claim 4 wherein preferentially linking the unlinked words to other unlinked words comprises:
   requiring a higher conditional probability for linking the unlinked words to a cluster than to other unlinked words.

7. The method of claim 4 and further comprising:
   setting a second probability threshold lower than the first probability threshold; and
   repeating, for any unlinked words in the selected pair of text fragments, the step generating the word type alignment by linking pairs of word types based on the conditional probability estimated, using the second probability threshold, but disallowing links of the unlinked words to clusters.

8. A computer implemented method of aligning words in pairs of bilingual, aligned text fragments, using a computer with a processor, comprising:
   generating a word type alignment for a selected pair of bilingual, aligned text fragments, the word type alignment including a plurality of word token alignments;
   calculating, with the processor, a measure of non-monotonicity of each of the word token alignments;
   identifying, with the processor, a word token alignment having a desired measure of non-monotonicity; and
   outputting an indication of word alignments in the identified word token alignment for use in a machine translation system.

9. The method of claim 8 wherein calculating a measure of non-monotonicity comprises:
   sorting word alignments in a selected word token alignment, based on word position of words in a first of the text fragments, to obtain a sequence of word position identifiers for aligned words in the first text fragment and a sequence of word position identifiers for corresponding aligned words in a second of the text fragments; and
   calculating the measure of non-monotonicity based on the sequence of word position identifiers for the second of the text fragments.

10. The method of claim 9 wherein calculating the measure of non-monotonicity comprises:
    identifying word position inversions in the sequence of word position identifiers for the second text fragment; and
    calculating a sum of differences in word position indicated by the word position identifiers for the identified word position inversions.

11. The method of claim 9 wherein calculating the measure of non-monotonicity comprises:
    identifying word position inversions in the sequence of word position identifiers for the second text fragment; and
    counting a number of the identified word position inversions.

12. The method of claim 9 and further comprising:
    secondarily sorting word alignments in the selected word token alignment based on word position of words in the second text fragment.

13. A computer implemented method of aligning words in pairs of bilingual, aligned text fragments, using a computer with a processor, comprising:
    generating, with the processor, a word type alignment for a selected pair of aligned text fragments by linking word types in the aligned text fragments based on statistical word association scores for words in the text fragments, the word type alignment including a plurality of word token alignments;
    calculating, with the processor, a non-monotonicity measure, indicative of a degree of monotonicity, for the word token alignments;
    generating additional links of instances of unlinked words in the word token alignments, if the additional links do not increase the non-monotonicity measure for the word token alignment for which they are generated; and
    outputting a translation output for use in a machine translation system based on links and additional links in the word token alignment.

14. The method of claim 13 and further comprising:
    if additional links have been added to some, but not all word token alignments, discarding word token alignments for which no additional links have been generated.

15. The method of claim 13 wherein generating a word type alignment is performed using a first threshold of the statistical word association scores and wherein generating additional links is done using a second threshold of the statistical word association score, lower than the first threshold.

16. The method of claim 13 wherein generating a word type alignment comprises linking word types in the aligned text fragments using a first conditional probability threshold based on whether the word types are linked using the statistical word association scores in other pairs of aligned text fragments, and wherein generating additional links is performed using a second conditional probability threshold lower than the first conditional probability threshold.

17. The method of claim 13 wherein generating additional links comprises:
    choosing a pair of word types, for which to generate the additional links of the instances of the words, in descending order of the statistical word association score.

* * * * *